United States Patent
Brecht et al.

(10) Patent No.: US 10,919,651 B2
(45) Date of Patent: Feb. 16, 2021

(54) METHOD FOR PRODUCING INDIVIDUAL DOSING QUANTITIES VIA A DRUM DOSING DEVICE

(71) Applicant: Harro Hoefliger Verpackungsmaschinen GmbH, Allmersbach im Tal (DE)

(72) Inventors: Sven Brecht, Allmersbach im Tal (DE); Bernhard Handel, Allmersbach im Tal (DE); Marcus Hild, Allmersbach im Tal (DE)

(73) Assignee: Harro Hoefliger Verpackungsmaschinen GmbH

( * ) Notice: Subject to any disclaimer, the term of this patent is extended or adjusted under 35 U.S.C. 154(b) by 0 days.

(21) Appl. No.: 16/536,027

(22) Filed: Aug. 8, 2019

(65) Prior Publication Data

US 2020/0047926 A1 Feb. 13, 2020

(30) Foreign Application Priority Data

Aug. 8, 2018 (EP) .................................... 18188045

(51) Int. Cl.
  *B65B 1/36* (2006.01)
  *B65B 1/10* (2006.01)
  (Continued)

(52) U.S. Cl.
  CPC .................. *B65B 1/36* (2013.01); *B65B 1/10* (2013.01); *B65B 5/101* (2013.01); *B65B 1/32* (2013.01); *B65B 2039/009* (2013.01)

(58) Field of Classification Search
  CPC ... A61J 3/074; B65B 1/10; B65B 1/16; B65B 1/32; B65B 1/36; B65B 5/101; B65B 2039/009
  See application file for complete search history.

(56) References Cited

U.S. PATENT DOCUMENTS

| 2,472,440 A | * | 6/1949 | Salfisberg | B29C 51/225 53/135.3 |
| 3,570,557 A | * | 3/1971 | Molins | A24D 3/0225 141/99 |

(Continued)

FOREIGN PATENT DOCUMENTS

| DE | 10226989 A1 | 1/2004 |
| EP | 2128027 A1 | 12/2009 |
| EP | 3257757 A1 | 12/2017 |

*Primary Examiner* — Gene O Crawford
*Assistant Examiner* — Kelvin L Randall, Jr.
(74) *Attorney, Agent, or Firm* — Walter Ottesen, P.A.

(57) ABSTRACT

A method is for producing individual dosing quantities of a powdered product via a drum dosing device. Individual masses of multiple ejected dosing quantities are sequentially determined. A mass mean value is formed and compared to a predetermined inner target mass range. If the mass mean value is inside the range, the level of the partial vacuum acting on the dosing opening in the filling position remains unchanged, and the above formation of a mass mean value begins anew. If the mass mean value is outside the range, an adapted partial vacuum is ascertained such that in the case of excessively low mass mean value, the level of the partial vacuum is increased, and in the case of excessively high mass mean value, the level of the partial vacuum is decreased. The adapted partial vacuum is applied to the dosing opening in the filling position.

10 Claims, 1 Drawing Sheet

(51) Int. Cl.
  *B65B 5/10* (2006.01)
  *B65B 1/32* (2006.01)
  *B65B 39/00* (2006.01)

(56) References Cited

U.S. PATENT DOCUMENTS

| | | | | |
|---|---|---|---|---|
| 3,656,518 | A * | 4/1972 | Aronson | B65B 1/16 141/1 |
| 3,889,591 | A * | 6/1975 | Noguchi | B41F 17/36 101/37 |
| 4,214,508 | A * | 7/1980 | Washington | A24D 3/0225 264/167 |
| 5,187,921 | A | 2/1993 | Wilson et al. | |
| 5,615,830 | A * | 4/1997 | Matsunaga | B05B 5/1683 222/368 |
| 5,826,633 | A * | 10/1998 | Parks | B65B 1/366 141/18 |
| 5,875,824 | A * | 3/1999 | Atwell | A24D 3/0225 141/125 |
| 6,286,421 | B1 * | 9/2001 | Ackley | B41F 17/36 101/35 |
| 6,805,174 | B2 * | 10/2004 | Smith | B65B 1/366 141/103 |
| 7,237,699 | B2 * | 7/2007 | Zill | B65B 1/16 222/189.06 |
| 7,284,679 | B2 * | 10/2007 | Zill | B65B 1/16 222/1 |
| 8,866,029 | B2 | 10/2014 | Kawanishi | |
| 9,516,804 | B1 * | 12/2016 | Djeu | A01C 7/046 |
| 10,004,647 | B2 * | 6/2018 | Jackels | A61F 13/15658 |
| 2003/0034085 | A1 * | 2/2003 | Spiers | B65B 1/366 141/125 |
| 2005/0023288 | A1 * | 2/2005 | Zill | B65B 1/385 222/1 |
| 2005/0023297 | A1 * | 2/2005 | Zill | B65B 1/16 222/250 |
| 2014/0353260 | A1 * | 12/2014 | Harkonen | B01D 33/463 210/770 |
| 2015/0217879 | A1 * | 8/2015 | Wolf | B65B 1/36 141/11 |

* cited by examiner

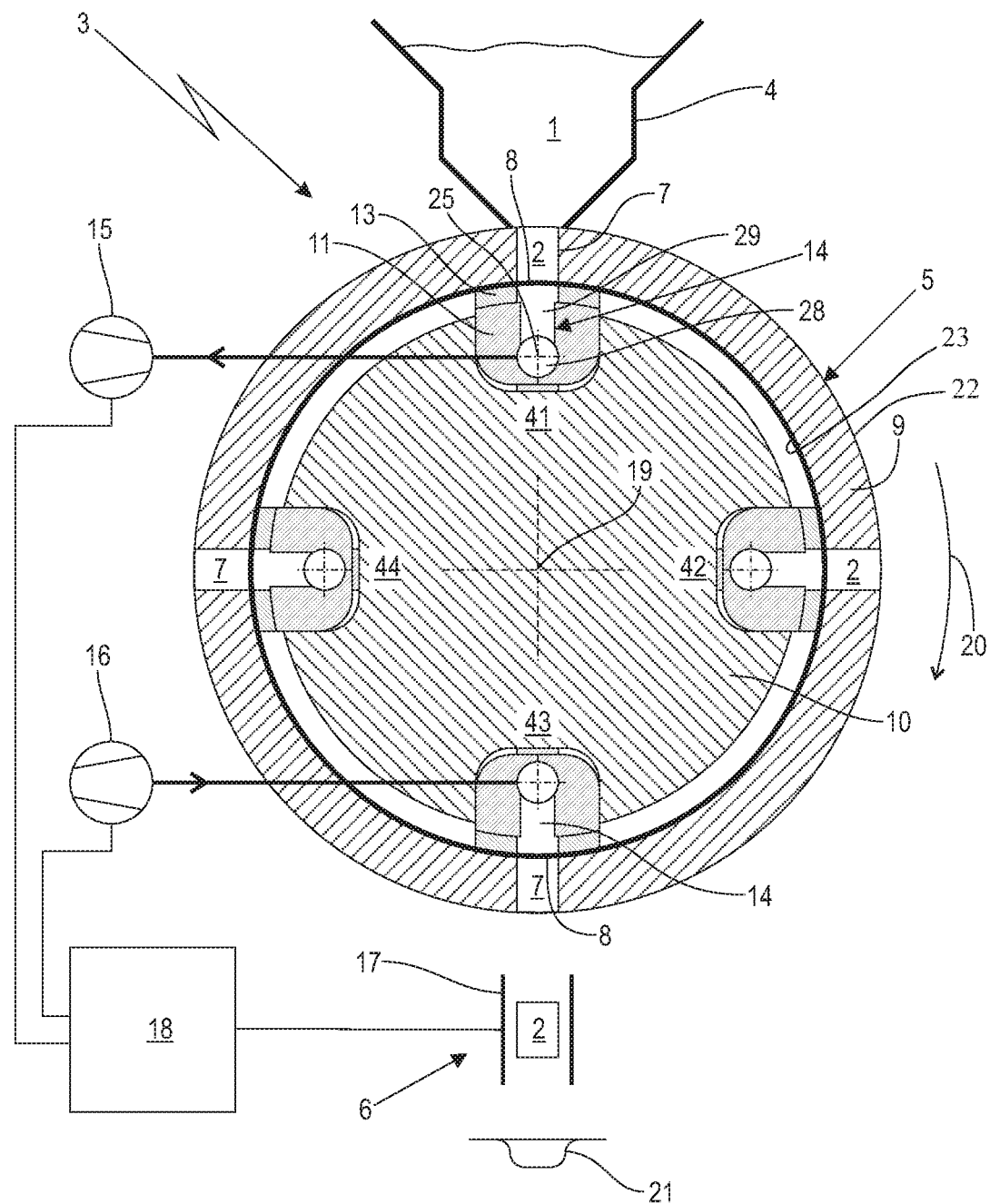

METHOD FOR PRODUCING INDIVIDUAL DOSING QUANTITIES VIA A DRUM DOSING DEVICE

CROSS REFERENCE TO RELATED APPLICATION

This application claims priority of European patent application no. 18 188 045.1, filed Aug. 8, 2018, the entire content of which is incorporated herein by reference.

FIELD OF THE INVENTION

The disclosure relates to a method for producing individual dosing quantities of a powdered product via a drum dosing device.

BACKGROUND OF THE INVENTION

In the pharmaceutical field, for example, but also in the field of nutritional supplements or the like, powders are processed which have to be provided in precisely measured partial quantities or dosing quantities for the provided delivery form. Target containers, for example, in the form of blisters, two-piece capsules, or the like are filled using such measured dosing quantities of a powdered product, so that the consumer has corresponding unit doses available and can take them.

Such powdered products are transferred in particular on so-called drum dosing devices into individually measured dosing quantities, which are then poured into respective associated target containers. Such a drum dosing device includes a dosing drum, which is provided on the peripheral side with at least one, generally with multiple dosing openings, wherein the dosing openings are delimited on the inner side via a filter element and a partial vacuum can be applied thereto through the filter element. Under the effect of the partial vacuum, powder is suctioned into the dosing openings, wherein dosing quantities of the powder form, the volume of which corresponds to the volume of the respective dosing opening. The dosing quantities formed in this manner are then ejected from the dosing openings and relayed to the target container.

It is clear from the preceding statements that the dosing via a drum dosing device is volumetric dosing. However, dosing is generally sought out in which the measured dosing quantity has a specific mass within a permissible tolerance bandwidth. In practice, it has been shown that the dosing quantities provided volumetrically by a drum dosing device do not always meet the requirements with respect to the actually achieved mass.

SUMMARY OF THE INVENTION

It is an object of the invention to provide a method, via which the individual masses produced by a drum dosing device can be kept within a predetermined tolerance range in a simple manner.

This object can, for example, be achieved by a method for producing individual dosing quantities of a powdered product via a drum dosing device, wherein the drum dosing device includes a product supply, a dosing drum, and a measuring device for the mass determination of the dosing quantities, wherein the dosing drum defines at least one dosing opening on a peripheral side thereof, wherein the at least one dosing opening is delimited on an inner side via a filter element and a partial vacuum can be applied thereto through the filter element. The method includes the steps of: in a filling position, filling the at least one dosing opening with a partial quantity of the powdered product from the product supply; in the filling position, applying the partial vacuum to the at least one dosing opening through the filter element, wherein a dosing quantity of the powdered product forms in the at least one dosing opening; rotating the dosing drum until the at least one dosing opening filled with the dosing quantity is located in an ejection position in which the dosing quantity is ejected out of the at least one dosing opening; further rotating the dosing drum until the emptied at least one dosing opening is again located in the filling position; cyclically repeating the above steps multiple times, wherein individual masses of multiple ejected dosing quantities are sequentially determined via the measuring device; forming a mass mean value from the determined individual masses of the multiple ejected dosing quantities, comparing the mass mean value to a predetermined inner target mass range, and using the mass mean value for a tendency regulation as follows:

if the mass mean value formed is within the predetermined inner target mass range, the level of the partial vacuum acting on the at least one dosing opening in the filling position remains unchanged, and the above formation of a mass mean value begins from the beginning; and, if the mass mean value formed is outside the predetermined inner target mass range, an adapted partial vacuum is ascertained in such a way that in the case of excessively low mass mean value, the level of the partial vacuum is increased, and in the case of excessively high mass mean value, the level of the partial vacuum is decreased, and the adapted partial vacuum is applied to the at least one dosing opening in the filling position.

The disclosure is firstly based on the finding that the variations to be observed in the actually achieved dosing mass can be divided into two categories. In a first category, there are short-term variations, in the case of which one individual mass differs from the following or preceding individual mass. Such variations between individual masses are to be attributed, in particular with very small target masses of a few milligrams, to local density variations in the powder, to variations in the degree of filling of the individual dosing openings, and also to varying degrees of emptying during the ejection of the dosing masses. While one can attempt to minimize variations within this first category as a whole, they are nonetheless considered to be unavoidable in principle.

A second category of mass changes is to be differentiated therefrom, which results in the longer term over a greater number of process cycles. According to the present disclosure, it has been recognized that this is a result of a gradual, trending change of the powder density in the finished measured dosing quantities, which is in turn predominantly to be attributed to two influencing variables. On the one hand, the supplied powder can change in its properties. On the other hand, the filter elements located at the bottom of the dosing openings tend to gradually clog with powder particles or the like in the course of numerous process steps, which influences the level of the acting partial vacuum during the suctioning in of the powdered product. It has been observed that if the pressure level is kept constant at the partial vacuum source, the partial vacuum actually acting in the dosing opening gradually decreases because of the gradually clogging filter element. With the decreasing effective partial vacuum, the density of the dosing quantities also gradually decreases, which results in gradually decreasing dosing masses if the dosing volume is kept constant.

Building thereon, a measuring device for mass determination of individual dosing quantities is now used in the scope of the disclosure. In this case, this is preferably a capacitive measuring system, in particular having a so-called AMV sensor (advanced mass verification sensor). However, other measuring or weighing systems can also be used in the scope of the disclosure, which permit the determination of the individual masses of single or multiple cumulative dosing quantities.

The disclosure does not seek to detect the short-term mass variations of the above first category and to act thereon. Rather, it relates to the recognition of a trend, because of which the individual masses of multiple ejected dosing quantities are determined sequentially via the measuring device, and wherein a mass mean value is then formed from the determined individual masses. For this purpose, it can be sufficient to detect only every second, third, or nth dosing mass and to form a mean value therefrom. However, the individual masses of multiple dosing quantities ejected in direct succession are preferably determined sequentially, from which the mass mean value is then determined. In any case, the mass mean value formed is compared to a predetermined inner target mass range.

At least two different basic scenarios now result depending on the result of this comparison. In the first scenario, if the mass mean value formed is within the predetermined inner target mass range, the level of the partial vacuum acting on the dosing opening in the filling position remains unchanged. There is thus no adaptation of the operating parameters. Rather, the running dosing process is continued unchanged, wherein a new cycle of measurements and mass mean value formation begins.

However, in the second scenario, if the mass mean value formed is outside the predetermined inner target mass range, an adapted partial vacuum is ascertained in such a manner that in the case of excessively low mass mean value, the level of the partial vacuum is increased, and in the case of excessively high mass mean value, the level of the partial vacuum is decreased. The adapted partial vacuum is now applied to the dosing openings in the filling position thereof. In this case, the effect is utilized that a change of the mass of the dosing quantity can be induced with uniform dosing volume via a change of the partial vacuum level. A readjustment of the actually achieved dosing mass is carried out via the above-described adaptation of the partial vacuum, with the goal that it is again within the predetermined inner target mass range. However, the regulation according to the disclosure is not an individual mass regulation, but rather regulates the actually achieved individual masses in the mass mean value thereof ascertained over multiple measurements, which is equivalent to a trend regulation and is referred to here as a tendency regulation. Disturbances of the regulating process due to individual short-term outliers or variations of the above-mentioned first category remain unconsidered, while longer-term changes, for example, as a result of product changes or clogging filter elements, can be adjusted out reliably. This adjustment can be carried out comfortably and reliably in a fully automatic manner without the action of an operator. An increase of the running time of the machine is achieved in an operator-friendly manner. By avoiding incorrectly dosed products, the efficiency is enhanced. Moreover, the method can be integrated into process monitoring. Deviations in the process parameters and product variations can be recognized early, which enables a timely correction.

In addition, it can be expedient that the mass mean value formed is also compared to a predetermined outer target mass range. The application of the adapted partial vacuum to the dosing opening in its filling position furthermore takes place when the mass mean value formed is outside the inner target mass range, if it additionally meets the condition, however, that it is inside the outer target mass range. However, if the mass mean value formed is outside the outer target mass range, it is then to be presumed that an excessively large and therefore alarming deviation exists here. In this case, an error signal is then generated. Depending on the error signal, for example, the process can be interrupted, while an adaptation of the partial vacuum does not occur.

In suitable structural forms of the drum dosing device, overpressure is applied to the dosing opening in its ejection position through the filter element to blow or eject the dosing quantity out of the dosing opening in this way. In an embodiment of the method, the level of the overpressure acting here is adapted similarly to the partial vacuum acting in the filling position. In this way, for example, the circumstance can be taken into consideration that for a repeatable mass determination, for example via a capacitive measuring system, repeating, uniform ejection conditions are necessary. The influence of the gradually clogging filter element can be compensated for by the mentioned adaptation of the overpressure level, wherein the blowing-out conditions can be kept constant in a desired manner.

In a first variant, it can be expedient for the pressure adaptation to be performed in fixedly predetermined pressure steps. A lesser control effort is required for this purpose, which contributes to a simplification of the process control. In an alternative variant, the pressure adaptation is performed by an adaptation value functionally dependent on the differential amount between mass mean value and target mass. Very exact readjustment is possible in such a functional, for example, proportional adaptation. The mentioned variants of the pressure adaptation can be used both for an adaptation of the partial vacuum and also for an adaptation of the overpressure.

The possibilities for pressure adaptation within a drum dosing device are limited. In particular, only a limited applicable partial vacuum range is available. In such a case, in which the level of the ascertained adapted partial vacuum is outside a permissible pressure range, an actually adapted partial vacuum is applied to the dosing opening in the filling position, the level of which corresponds to a corresponding limiting value of the permissible pressure range. It is then not the exact desired adapted partial vacuum. Nonetheless, a less pronounced adaptation accompanying this can be sufficient so that the actual mass mean values thus achieved are still within the permissible range, so that the production can be continued. An error signal, on the basis of which a production interruption can be performed, is only generated upon a detection of mass mean values which no longer are in the permissible range.

For a reliable determination of the mass mean values and the trend thus emerging of a mass change, it is desirable to substantially eliminate the influence of unavoidable short-term mass variations. This can already be achieved in that such a mass mean value is derived from only a few individual masses. However, the mass mean value is preferably formed from at least 20 and in particular also at least 100 determined individual masses. In particular, it can be expedient to first begin with a small number of individual masses for the mass mean value determination, wherein higher numbers of individual masses are then used for the mass mean value determination with progressing process reliability.

In an embodiment, the following method steps are also additionally executed: from the determined individual masses of the multiple ejected dosing quantities, in addition to the mass mean value, the relative standard deviation thereof is also computed and compared to a predetermined limiting deviation. If the computed standard deviation is less than or equal to the limiting deviation, the mass mean value is thus used for the tendency regulation. If the computed standard deviation is greater than the limiting deviation, an error signal is generated. In this way, it is ensured that the tendency regulation is only used when it is based on sufficiently reliable measured data.

BRIEF DESCRIPTION OF THE DRAWINGS

The invention will now be described with reference to the single FIGURE of the drawing (FIG. 1) which shows a schematic cross-sectional illustration of a drum dosing device having a product supply, having a dosing drum, and having a measuring device for the mass determination of the individual dosing quantities during the execution of the method.

DESCRIPTION OF THE PREFERRED
EMBODIMENTS OF THE INVENTION

FIG. 1 shows a schematic cross-sectional illustration of a drum dosing device 3 during the production of individual dosing quantities 2 of a powdered product 1 and for the transfer of such individual dosing quantities 2 into a target container 21. The powdered product is a pharmaceutical powder here. However, it can also be a powdered nutritional supplement or the like. The target container 21 is a schematically indicated blister here, which is also sealed using a cover foil after the filling. However, two-part capsules or other containers also come into consideration as the target container 21.

The drum dosing device 3 includes a product supply 4, a dosing drum 5, and a measuring device 6. The powdered product 1 is kept ready for measurement in the funnel-shaped product supply 4. Partial quantities of the powdered product 1 are removed from the product supply 4 via the dosing drum and volumetrically exactly defined dosing quantities 2 are formed therefrom. A subsequent mass determination of individual, in particular all dosing quantities 2 is performed via the measuring device 6.

The dosing drum 5 extends along a longitudinal axis and is formed substantially cylindrical in relation to this longitudinal axis. On the peripheral side, it has at least one dosing opening 7. In the embodiment shown, the dosing drum 5 is provided with multiple dosing openings 7. Although it is not recognizable in the cross-sectional illustration shown here, each three to twelve dosing openings 7 form an opening row, which extends axially-parallel in relation to the axis of rotation 19. Four such opening rows are positioned around the axis of rotation 19 in the peripheral direction at equal angle intervals, that is, at 90° in relation to one another. One in each case, that is, a total of four dosing openings 7, are recognizable here of the mentioned opening rows. However, deviating numbers of dosing openings 7 in the axial direction and/or in the peripheral direction can also be expedient.

The dosing drum 5 has a central clamping core 10 and a drum jacket 9 enclosing the clamping core 10 with radial spacing. The dosing openings 7 are formed as boreholes extending radially through the drum jacket 9 having circular outline. However, other outline shapes can also be expedient. For example, the shape of the outline can be solely partially round, oval, polygonal, rectangular, or square. The dosing openings 7 are open radially outward, that is, on an outer side 22 of the drum jacket 9. They are each delimited via one filter element 8 on the radial inside, that is, on an inner side 23 of the drum jacket 9, which filter element corresponds in size and shape to the cross section of the respective dosing opening 7 and forms its bottom.

Corresponding to the number of the above-mentioned opening rows, the clamping core 10 has a number of receptacle grooves extending axially-parallel in relation to the axis of rotation 19, in each of which a filter strip 11 is held. An optional seal 13 is attached between the filter strip 11 and the inner side 23 of the drum jacket 9.

A branched pressure channel 14 is formed in each of the filter strips 11, which opens through the filter elements 8 into corresponding dosing openings 7. The pressure channel 14 includes a main channel 28 and at least one branch 29. In the embodiment, the pressure channel 14 includes twelve branches 29 corresponding to a corresponding number of dosing openings 7 within an axially-parallel row thereof. The main channel 28 extends along a longitudinal axis 25 of the pressure channel 14. The longitudinal axis 25 extends parallel to the axis of rotation 19 of the dosing drum 5. The branches 29 of the pressure channel 14 extend proceeding from the main channel 28 radially with respect to the axis of rotation 19 up to the dosing openings 7.

The filter elements 8 are jointly formed by a sheet made of suitable filter material, which is wound around the clamping core 10 having the filter strips 11. However, adhesively-bonded filter elements 8 can also be used. The filter strips 11 are clamped radially outward with the filter material interposed against the inner side of the drum jacket 9 via a clamping cone (not shown). The seals 13 press the filter material against the inner side of the drum material, on the one hand, while they also seal, around the respective filter element 8, the associated branch 29 of the pressure channel 14 and also the respective dosing opening 7 against the surroundings, on the other hand. In this way, it is ensured that a pressure equalization between dosing opening and pressure channel 14 solely takes place through the associated filter element 8, and that a specific desired pressure can thus be applied to the dosing openings via the associated pressure channel 14 through the respective filter element 8.

The dosing drum 5 is rotatably mounted around an axis of rotation 19 in the direction of an arrow 20 and is provided with an associated rotational drive (not shown here). In operation, the dosing drum is rotated in cycles, wherein the individual dosing openings 7 come to rest cyclically in an upper filling position 41 in the direction of gravity and in a lower ejection position 43 in the direction of gravity in at least two cycles. Instead of a cyclic movement, a continuous rotation can also be expedient. In the embodiment shown, the individual dosing openings 7 cyclically pass through four different positions in four cycles, beginning with the upper filling position 41, followed by a first intermediate position 42. The lower ejection position 43 and a second intermediate position 44 then follow, before the cycle begins again at the upper filling position 41. In the upper filling position 41, the respective dosing opening 7 is filled using the powdered product 1 from the product supply 4 to form a dosing quantity 2. In the subsequent first intermediate position 42, a fill level check can optionally be performed. In the lower ejection position 43, the dosing quantity 2 is ejected out of the dosing opening 7 and supplied to the target container 21. The dosing opening 7 which is now emptied is moved farther to the second intermediate position 44 and can optionally be cleaned there, for example, by blowing out.

A partial vacuum can be applied as needed to the dosing openings 7 on the inner side and through the respective filter element 8. For this purpose, a partial-vacuum-transmitting connection is established between the pressure channel 14 and a partial vacuum source 15 at least in the filling position 41. The level of the partial vacuum provided by the partial vacuum source 15 is set via a schematically indicated control unit 18, which can be carried out by a suitable control, but possibly also by a regulation. In any case, the partial vacuum set in such a manner is transmitted through the pressure channel 14 and the filter element 8 into the dosing opening 7 when it is located in the upper filling position 41. The partial vacuum suctions the powdered product 1 out of the product supply 4 into the dosing opening 7. The filter element 8 is dimensioned with respect to its permeability and adapted to the product 1 in such a way that it is air-permeable and thus also pressure-transmitting, but the powdered product 1 is held back and prevented from passage. As a result, a dosing quantity 2 of the powdered product 1 results which completely fills up the dosing opening 7, and the volume of which corresponds to the volume of the dosing opening 7. The procedure of filling up can optionally also be assisted by a stirrer (not shown) in the product supply 4. Depending on the level of the prevailing partial vacuum and the properties of the product 1, in any case a specific degree of compaction of the product 1 results in the dosing opening 7, so that a specific mass of the dosing quantity 2 also follows from the predetermined volume of the dosing opening 7.

The applied partial vacuum can still be maintained at the same level or also at a reduced level until reaching the ejection position 43, in order to prevent premature falling of the dosing quantity 2 out of the dosing opening 7. At latest upon reaching the lower ejection position 43, however, the partial vacuum application is ended, so that the dosing quantity 2 exits here from the dosing opening 7 and is transferred into the target container 21. This can be achieved by simply switching off the partial vacuum application, so that the dosing quantity 2 falls out of the dosing opening 7 as a result of its intrinsic weight. In the embodiment shown, however, overpressure is now applied instead of partial vacuum to the dosing opening 7 in the ejection position 43 through the filter element 8. For this purpose, an overpressure-transmitting connection is established between the pressure channel 14 and an overpressure source 16. The level of the overpressure provided by the overpressure source 16 is also set as in the above-mentioned case of the partial vacuum source via the schematically indicated control unit 18, which can again be carried out by suitable control, but possibly also by a regulation. In any case, the overpressure set in such a manner is transmitted through the pressure channel 14 and the filter element 8 into the dosing opening 7 when it is located in the lower ejection position 43. The overpressure blows the dosing quantity out of the dosing opening 7. In addition, the overpressure application can still be used in the following second intermediate position 44 for the cleaning procedure there of the emptied dosing opening 7.

A capacitive sensor 17, which is also connected to the control unit 18, is part of the above-mentioned measuring device 6 for the mass determination of the individual dosing quantities 2. The measured data of the capacitive sensor 17 are acquired and analyzed in the control unit 18, which results overall in the formation of the measuring device 6. Instead of a capacitive measuring device 6, however, another suitable measuring device can also be used for determining the individual masses of the dosing quantities 2. In any case, the dosing quantities 2 ejected from the dosing opening 7 in the lower ejection position 43 fall through the sensor, through the capacitive sensor 17 here, into the target container 21. The mass of the passing dosing quantity 2 is determined in accordance with an AMV system (advanced mass verification system) from the field change taking place in this case in the capacitive sensor 17. It is not absolutely necessary for the execution of the method that the mass of each individual ejected dosing quantity 2 is determined. Rather, it can be sufficient if individual mass determinations only repeat after several dosing cycles. However, a mass determination can preferably be carried out in the case of 100% of the measured dosing quantities 2. A further option is not to determine each individual mass of each individual dosing quantity 2 individually. Rather, it can be sufficient to cumulatively determine the mass total of multiple dosing quantities 2, wherein then averaged individual masses of the individual dosing quantity 2 can be formed via division of the cumulative mass total by the number of the multiple dosing quantities 2. In the scope of the disclosure, the latter also includes the option of dispensing with the determination of the averaged individual masses and building the tendency regulation on the cumulative mass totals being used directly as the individual masses, and then the mass mean value being determined therefrom.

In any case, a mass mean value is formed in the control unit 18 from the sequentially determined individual masses of the multiple ejected dosing quantities 2 and compared to a predetermined inner target mass range. For illustration, several exemplary numeric specifications, which are not to be understood as restrictive, however, are mentioned here. For example, the target mass to be achieved of an individual dosing quantity 2 is 20 mg here, for which an exemplary inner target mass range is predetermined, which extends from 19 mg to 21 mg. Both the individual masses of the individual dosing quantities 2 and also the measured values resulting therefrom of the measuring device 6 result in individual masses which are determined with varying amounts. It is firstly unimportant for the method in this case whether individual ones of these determined individual masses are inside or outside the predetermined inner target mass range. Rather, a mass mean value, which is 20.5 mg here by way of example, is formed from at least 20 and in particular at least 100 determined individual masses. If the mass mean value formed is now inside the predetermined inner target mass range of, for example, 19 mg to 21 mg here as in the preceding example at 20.5 mg, the level of the partial vacuum acting on the dosing opening 7 in the filling position 41 remains unchanged. The preceding dosing method is continued, wherein in addition to the measurement of the individual dosing quantities, the mass determination thereof is also continued. However, the above formation of a mass mean value now begins again from the beginning on the basis of a new series of measured values.

The case can occur, however, that in particular later in the course of slowly changing conditions, a mass mean value is ascertained which is outside the predetermined inner target mass range. This can be attributed to changing product properties and/or to slowly clogging filter elements 8. For example, such a mass mean value acquired later can be 18 mg and can thus be below the exemplary inner target mass range of 19 mg to 21 mg. In this case, an adapted partial vacuum is ascertained in such a way that in the case of excessively low mass mean value, the level of the partial vacuum is increased and in the case of excessively high mass mean value, the level of the partial vacuum is decreased. The control unit 18 acts accordingly on the partial vacuum source 15, according to which the adapted partial vacuum is applied to the dosing opening in the filling position. In the above-mentioned example, the adapted partial vacuum is increased in relation to the preceding value, and thus has a greater differential amount in relation to the ambient pressure. A greater compaction of the powdered product 1 in the dosing opening 7 results from now on, which results in an increased dosing mass with uniform chamber volume.

The process of the dosing and measuring is also continued proceeding therefrom, wherein a new cycle of individual mass determination and mean value formation now begins. If this new mean value again is now inside the above-mentioned inner target mass range, the previously adapted partial vacuum now remains unchanged. Otherwise, a further adaptation takes place according to the above-described pattern, until the ascertained mass mean value is now as desired within the predetermined inner target mass range.

The above-described adaptation or trend regulation of the partial vacuum is subject to certain additional limits, however. A predetermined outer target mass range can be used as one such additional limit. This outer target mass range can correspond, for example, to a tolerance range, inside which the measured dosing quantities are still acceptable, and outside which the dosing quantities have to be discarded. Alternatively or additionally, it can be established by the outer target mass range that mass mean values lying outside are excessively far away from the desired value and therefore it has to be presumed that the attempted trend regulation does not result in the desired achievement. In any case, one option is that the mass mean value formed is also compared to this outer target mass range. The application of the adapted partial vacuum to the dosing opening in the filling position according to the above pattern only takes place if the mass mean value formed is outside the inner target mass range and inside the outer target mass range. However, if the mass mean value formed is outside the outer target mass range, an error signal is generated, which can be used, for example, to terminate the dosing method.

The above additional comparison is also to be explained here on the basis of an example. An exemplary outer target mass range is established from 17 mg to 23 mg. The further above-mentioned mass mean value, which was ascertained at an amount of 18 mg, is outside the exemplary inner target mass range of 19 mg to 21 mg, but inside the exemplary outer target mass range of 17 mg to 23 mg. As a result, the adaptation of the partial vacuum is performed as described above. However, if a mass mean value of, for example, 16 mg is determined, it is outside the exemplary outer target mass range of 17 mg to 23 mg, which then results in an error message. In this case, it is presumed that a tendency regulation limit is exceeded, that is, that the tendency regulation possibly does not result in the desired achievement, and that corresponding counter measures are to be initiated.

A further limit also to be considered can be, for example, in the limits of the available partial vacuum. The case can occur that an adapted partial vacuum is ascertained via the trend regulation, which cannot be provided at all by the system. If the level of the ascertained adapted partial vacuum is outside a permissible or available pressure range, this can be recognized and the method can be terminated. However, the method does not necessarily have to be terminated in such a case. Rather, it can be expedient that an actually adapted partial vacuum is applied to the dosing opening in the filling position, the level of which corresponds to a corresponding limiting value of the permissible pressure range. If the above-described trend regulation thus has the result, for example, that in the upper filling position 41 firstly −800 mbar relative partial vacuum act, and subsequently −900 mbar relative partial vacuum are to act, while actually no more than −850 mbar of relative partial vacuum are available, however, these −850 mbar are thus now applied as the corresponding limiting value of the permissible pressure range.

As already mentioned above, in addition to the partial vacuum source 15, the overpressure source 16 is also connected to the control unit 18, so that the overpressure level of the overpressure source 16 can be determined and/or controlled via the control unit 18. In the embodiment of the method described here, the overpressure provided by the overpressure source 16 is applied to the dosing opening 7 in its ejection position 43 through the filter element 8, wherein the level of the overpressure is adapted similarly to the partial vacuum acting in the filling position 41. It was described by way of example above that the partial vacuum or its difference in relation to the ambient pressure was increased. Consequently, the blowing-out overpressure or its difference in relation to the ambient pressure is also increased, to effectuate reliable blowing out in spite of a possibly partially clogged filter element 8.

Depending on the application, it can be expedient to perform the above-described pressure adaptation in fixedly predetermined steps of, for example, 100 mbar or 50 mbar. Alternatively, a pressure adaptation can be performed using an adaptation value which is functionally dependent on the differential amount between the mass mean value and a target mass.

Optionally, in addition to the mass mean value, the relative standard deviation thereof is also computed from the determined individual masses of the multiple ejected dosing quantities 2 and compared to a predetermined limiting deviation. If the computed standard deviation is less than or equal to the limiting deviation, this measurement series is thus considered to be correctly processed and statistically usable. As a result, the mass mean value is used for the tendency regulation. However, if the computed standard deviation is greater than the limiting deviation, this measurement series is considered to be unemployable in the process and/or statistically unusable. An error signal is then generated, which is taken as a prompt to initiate suitable countermeasures. It can be expedient in particular to then discard the mass mean value formed, that is, not to use it for a further tendency regulation.

All of the above-mentioned measures are used for the purpose of bringing about a trend or tendency regulation with a reliable process. However, this applies only to the procedure of the tendency regulation and has no direct influence on the sorting and/or good-bad elimination of the individual dosing quantities 2. For the latter, the individually measured individual masses of the individual dosing quantities 2 are used.

It is understood that the foregoing description is that of the preferred embodiments of the invention and that various changes and modifications may be made thereto without departing from the spirit and scope of the invention as defined in the appended claims.

What is claimed is:

1. A method for producing individual dosing quantities of a powdered product via a drum dosing device, wherein the drum dosing device includes a product supply, a dosing drum, and a measuring device for the mass determination of the dosing quantities, wherein the dosing drum defines at least one dosing opening on a peripheral side thereof, wherein the at least one dosing opening is delimited on an inner side via a filter element and a partial vacuum can be applied thereto through the filter element, the method comprising the steps of:

in a filling position, filling the at least one dosing opening with a partial quantity of the powdered product from the product supply;

in the filling position, applying the partial vacuum to the at least one dosing opening through the filter element, wherein a dosing quantity of the powdered product forms in the at least one dosing opening;

rotating the dosing drum until the at least one dosing opening filled with the dosing quantity is located in an ejection position in which the dosing quantity is ejected out of the at least one dosing opening;

further rotating the dosing drum until the emptied at least one dosing opening is again located in the filling position;

cyclically repeating the above steps multiple times, wherein individual masses of multiple ejected dosing quantities are sequentially determined via the measuring device;

forming a mass mean value from the determined individual masses of the multiple ejected dosing quantities, comparing the mass mean value to a predetermined inner target mass range, and using the mass mean value for a tendency regulation as follows:

if the mass mean value formed is within the predetermined inner target mass range, the level of the partial vacuum acting on the at least one dosing opening in the filling position remains unchanged, and the above formation of a mass mean value begins from the beginning; and, if the mass mean value formed is outside the predetermined inner target mass range, an adapted partial vacuum is ascertained in such a way that in a case of excessively low mass mean value, the level of the partial vacuum is increased, and in a case of excessively high mass mean value, the level of the partial vacuum is decreased, and the adapted partial vacuum is applied to the at least one dosing opening in the filling position.

2. The method as claimed in claim 1, wherein:
the mass mean value formed is also compared to a predetermined outer target mass range; and,
the application of the adapted partial vacuum to the at least one dosing opening in the filling position takes place if the mass mean value formed is outside the inner target mass range and inside the outer target mass range, and an error signal is generated if the mass mean value formed is outside the outer target mass range.

3. The method of claim 1 further comprising the step of applying overpressure to the at least one dosing opening in the ejection position through the filter element, and the level of the overpressure being adapted similarly to the partial vacuum acting in the filling position.

4. The method of claim 1, wherein a pressure adaptation is performed in fixedly predetermined pressure steps.

5. The method of claim 1, wherein a pressure adaptation is performed by an adaptation value functionally dependent on a differential amount between the mass mean value and a target mass.

6. The method as claimed in claim 1, wherein individual masses of multiple directly successively ejected dosing quantities are sequentially determined via the measuring device, and the mass mean value is formed from the determined individual masses of multiple directly successively ejected dosing quantities.

7. The method as claimed in claim 1, wherein in a case in which a level of the ascertained adapted partial vacuum is outside a permissible pressure range, an actually adapted partial vacuum is applied to the at least one dosing opening in the filling position; and, the level of the actually adapted partial vacuum corresponds to a corresponding limiting value of the permissible pressure range.

8. The method of claim 1, wherein the mass mean value is formed from at least twenty determined individual masses.

9. The method of claim 1, wherein the mass mean value is formed from at least one hundred determined individual masses.

10. The method of claim 1 further comprising the steps of:
in addition to the mass mean value, computing a relative standard deviation thereof from the determined individual masses of multiple ejected dosing quantities and comparing the relative standard deviation to a predetermined limiting deviation;
using the mass mean value for tendency regulation if the computed standard deviation is less than or equal to the predetermined limiting deviation; and,
generating an error signal if the computed standard deviation is greater than the predetermined limiting deviation.

* * * * *